(12) United States Patent
Bergholz et al.

(10) Patent No.: US 7,007,017 B2
(45) Date of Patent: Feb. 28, 2006

(54) METHOD FOR AUTOMATIC DISCOVERY OF QUERY LANGUAGE FEATURES OF WEB SITES

(75) Inventors: Andre Bergholz, Grenoble (FR); Boris Chidlovskii, Meylan (FR)

(73) Assignee: Xerox Corporation, Stamford, CT (US)

( * ) Notice: Subject to any disclaimer, the term of this patent is extended or adjusted under 35 U.S.C. 154(b) by 547 days.

(21) Appl. No.: 10/361,955

(22) Filed: Feb. 10, 2003

(65) Prior Publication Data

US 2004/0162814 A1  Aug. 19, 2004

(51) Int. Cl.
*G06F 17/30* (2006.01)
(52) U.S. Cl. .............................. 707/4; 707/5
(58) Field of Classification Search ............... 707/100, 707/5, 3, 2, 1, 103 R, 4; 715/700
See application file for complete search history.

(56) References Cited

U.S. PATENT DOCUMENTS

| | | | |
|---|---|---|---|
| 6,102,969 A | 8/2000 | Christianson et al. | 717/8 |
| 6,584,470 B1 * | 6/2003 | Veale | 707/102 |
| 2004/0267760 A1 * | 12/2004 | Brundage et al. | 707/100 |

FOREIGN PATENT DOCUMENTS

WO  WO 01/57711  8/2001

OTHER PUBLICATIONS

"QProber: A System for Automatic Classification of Hidden-Web Databases", Gravano et al.□□ACM Transactions on Onformation Systems, vol. 21, No. 1, Jan. 2003, pp. 1-41.*
Christian Borgelt, Christian Borgelt's Software Page, retrieved Jan. 8, 2003, http://fuzzy.cs.uni-magdeburg.de/~borgelt/software.html, p 1-6.
Kevin Chen-Chuan Chang, Hector Garcia-Molina, Andreas Paepcke, Boolean Query Mapping Across Heterogeneous Information Sources, in IEEE Transaction on Knowledge and Data Engineering, vol. 8, No. 4, 1996, p. 515-521.
Chen-Chuan K. Chang, Hector Garcia-Molina, Mind Your Vocabulary: Query Mapping Across Heterogeneous Information Sources, in Proceedings of the 1999 ACM SIGMOD, Jun. 1999.

(Continued)

*Primary Examiner*—Jeffrey Gaffin
*Assistant Examiner*—Michael J. Hicks
(74) *Attorney, Agent, or Firm*—Jeannette Walder

(57) ABSTRACT

A method for automatically determining query language operators of a Web information source, includes providing a set of known query operators, each known query operator in the set operating according to at least one syntax, wherein for a test query comprising a query operator and a test key word, each syntax of the operator produces a different number of document matches for the test query at a known Web information source; performing the test query on the Web information source, wherein the test query produces a number of document matches on the Web information source; comparing the number of document matches produced by the Web information source with the number of document matches produced by the known operator's different syntaxes; and using an established criteria for determining if comparing results indicate the Web information source supports the known query operator according its matching syntax.

18 Claims, 1 Drawing Sheet

OTHER PUBLICATIONS

Panagiotis G. Ipeirotis, Luis Gravano, Mehran Sahami, Probe, Count, and Classify: Categorizing Hidden-Web Databases, in Proceedings of the ACM SIGMOD International Conference on Management of Data, Santa Barbara, CA, May 2001, p. 67-78.

Mike Perkowitz, Robert B. Doorenbos, Oren Etzioni, Daniel S. Weld, Learning to Understand Information on the Internet: An Example-Based Approach, Journal of Intelligent Information Systems, 8(2), 1997, p. 133-153.

Sriram Raghavan, Hector Garcia-Molina, Crawling the Hidden Web, in Proceedings of the International Conference on Very Large Databases (VLDB), Rome, Italy, Sep. 2001, p. 129-138.

Weiyi Meng, Wenxian Wang, Hongyu Sun, Clement Yu, Concept Hierarchy Based Text Database Categorization, in Proceedings of the Internal Conference on Web Information Systems Engineering, Hong Kong, China, Jun. 2000, p. 283-290.

Andre Bergholz, Boris Chidlovskii, "Learning Query Languages of Web Interfaces", ACM SAC, Mar. 14, 2004, pp. 1114-1121.

Andre Bergholz, Boris Chidlovskii, "Using Query Probing to Identify Query Language Features on the Web", SIGIR, Aug. 1, 2003, pp. 1-10.

Jamie Callan, Margaret Connell, Aiqun Du, "Automatic Discovery of Language Models for Text Databases", ACM SIGMOD, Philadelphia, PA, 1999, pp. 479-490.

\* cited by examiner

METHOD FOR AUTOMATIC DISCOVERY OF QUERY LANGUAGE FEATURES OF WEB SITES

FIELD OF THE INVENTION

This invention relates generally to information retrieval and integration systems, and more particularly, to the automatic discovery of query language features of Web information sources.

BACKGROUND OF THE INVENTION

The World Wide Web (the "Web" or "WWW") is an architectural framework for accessing documents (or Web pages) stored on a worldwide network of distributed servers called the Internet. An information source is any networked repository, e.g., a corporate database, a WWW site or any other processing service. Documents stored on the Internet are defined as Web pages. The architectural framework of the Web integrates Web pages stored on the Internet using links. Web pages consist of elements that may include text, graphics, images, video and audio. All Web pages or documents sent over the Web are prepared using HTML (hypertext markup language) format or structure. An HTML file includes elements describing the document's content as well as numerous markup instructions, which are used to display the document to the user on a display.

Access to online information via the Web is exploding. Search engines must integrate a huge variety of repositories storing this information in heterogeneous formats. While all files sent over the Web are prepared using HTML format, the heterogeneity issue remains both in terms of search query formats and search result formats. Search engines must provide for homogeneous access (to the underlying heterogeneity of the information) and allow for homogenous presentation of the information found. A search engine (including a meta-search engine such as Xerox askOnce) uses wrappers to extract and regenerate information from documents stored in heterogeneous Web information sources.

A wrapper is a type of interface or container that is tied to data; it encapsulates and hides the intricacies of a remote information source in accordance with a set of rules known as a grammar or a wrapper grammar, providing two functions to an information broker. Wrappers are used to translate a client query to a corresponding one that the remote information source will understand. Wrappers are also used by search engines to extract the information stored in the HTML files representing the individual Web pages; the wrapper scans the HTML files returned by the search engine, drops the markup instructions and extracts the information related to the query. If an information broker is involved, the wrapper parses (or processes) the results in a form that can be interpreted and filtered by the information broker. Then the wrapper takes the search answers, either from the different document repositories or from the information broker, puts them in a new format that can be viewed by the user. Extraction and parsing is done in accordance with the grammar or rules for the particular type of response file.

In addition to generating a wrapper which is capable of extracting and regenerating information from documents stored in heterogeneous Web information sources, a search engine must also be capable of automatically acquiring the individual search query language features supported by each Web information resource. Search query language features include, for example, the Boolean operators, how a Web information source treats quotation marks around search key words, how a Web information source treats parentheses and commas, etc. Due to the innate heterogeneity of Web information sources, sources differ not only in the query features but also in their syntactic representation. For example, the Boolean operator "AND" can be represented as "and", "&" or "" (whitespace).

Searching for relevant information is a primary activity on the Web. Often, people search for information using general-purpose search engines, such as Google or Yahoo!, which collect and index billions of Web pages. However, an important fragment of the Web remains unavailable for centralized indexing, called the "hidden" Web, which includes the content of local databases and document collections accessible though search interfaces offered by various small and mid-sized Web sites, including company sites, university sites, media sites, etc. According to a study conducted by BrightPlanet in 2000, the size of the Hidden Web is about 400 to 550 times larger than the commonly defined (or "Visible") World Wide Web.

Commercial approaches to the Hidden Web have usually the form of Yahoo!-like directories organizing local sites in specific domains. Some important examples of such directories are www.InvisibleWeb.com and www.BrightPlanet.com. BrightPlanet.com's gateway site CompletePlanet.com is a directory as well as a meta-search engine. For each database it incorporates into its search, a meta-search engine uses a manually written wrapper.

Similar to the Visible Web, search resources on the Hidden Web are highly heterogeneous. In particular, they use different document retrieval models, such as the Boolean or the vector-space model. They allow different operators for query formulation and moreover, the syntax of supported operators can vary from one site to another. Conventionally, query languages are determined manually; reading the help pages associated with a given search interface, probing the interface with sample queries and checking the result pages is often the method of choice.

The manual acquisition of Web search interfaces has important shortcomings. First, the manual approach is hardly scalable to thousands of search resources that compose the Hidden Web. Second, the manual testing of Web resources with probe queries is often error-prone. Third, cases of incorrect or incomplete help pages are frequent. Operators that are actually supported by an engine may not be mentioned in the help pages, and conversely, help pages might mention operators that are not supported by the engine.

SUMMARY OF THE INVENTION

To overcome the shortcomings of the manual approach, a method for automatically acquiring the query languages of Web information sources is described. A method for automatically determining query language operators of a Web information source, according to the invention includes providing a search interface for submitting a query, for retrieving documents from a Web information source and for reporting the number of document matches for the query; providing a set of known query operators, each known query operator in the set operating according to at least one syntax, wherein for a test query comprising a query operator and a test key word, each syntax of the operator produces a different number of document matches for the test query at a known Web information source; performing the test query on the Web information source, wherein the test query produces a number of document matches on the Web information source; comparing the number of document matches produced by the Web information source with the number of document matches produced by the known operator's different syntaxes; and using an established criteria for determining if comparing results indicate the Web information source supports the known query operator according its matching syntax. A method for automatically determining query language operators of a Web information source, according to the invention, includes providing a set of known query operators, each known query operator in the set is encoded in one or more syntaxes.

The method of the invention automatically discovers the query language used by a Web information source, which may be a search engine (such as Google, or Yahoo!), a meta-search engine (such as askOnce) or any Web database. The method of the invention automatically probes a Web information source's search interface with a set of test queries and analyses the returned pages to recognize supported query operators. In one embodiment, the established criteria is a set of classification rules that recognize the query operators supported by a Web information source and their syntactic encoding. In this embodiment, the automatic acquisition assumes the availability of the number of matches the resource returns for a submitted query. The match numbers are used to train a learner and to generate the classification rules that recognize the query operators supported by a Web information source and their syntactic encoding. The method is applicable to any set of query operators and their syntaxes; though for convenience only, the method is further described on a set of query operators most frequently used by Web information sources, including the stemming, Boolean operators AND, OR with various syntactic representations.

A test query may include one query operator and one key word. The number of key words (either one or two) in a test query depends on the type of query operator. Test queries for (syntax of) unary operators (that is, case sensitivity and stemming) use one key word, while test queries for binary operators (that is, Boolean operators and phrases) require two key words. In many cases, one query operator syntax can be differentiated from another query operator syntax just by the number of document matches for one test query. But often, this differentiation is more complex and require analysis and comparison of the numbers of document matches for multiple test queries. Machine learning techniques can be used to facilitate this analysis and comparison.

The set of classification rules may be determined by the following approach. Certain types of queries involving query operators and one or more key words are defined and used to investigate the syntax of the query operators. For each query operator, possible syntaxes are defined. Then an ensemble of test queries is used to retrieve the number of matches they have on a set of test search sites (known Web information sources). Rules that determine the semantics of the original query type based on the match numbers of the test queries are developed.

In one embodiment, the method defines a list of test queries, each consisting of an operator and two key words. The key words may be chosen in three different categories; the first category select words that are likely to be adjacent, the second, words that are likely to occur in the same document and the third one has words that seldom occur in the same text. For each test query, the method defines a list of possible semantic interpretation, for example: LIT (literal matching), CAS (case-insensitive matching), STM (matching including stemming), ADJ (adjacency), AND, OR, FST (matches first word only), SND (matches second word only), etc. The method may employ the use of a machine-learning technique, such as the one based on Borgelt's decision tree to derive a (query, syntax) association from the number of matches in the result. The decision tree is built by running the test queries against a number of test sites, the features of which are known, and by normalizing the number of matches for each query. After this training phase, the decision tree can be used to predict the nature of the query language of any new search engine.

DETAILED DESCRIPTION OF THE EMBODIMENTS

Figure 1:
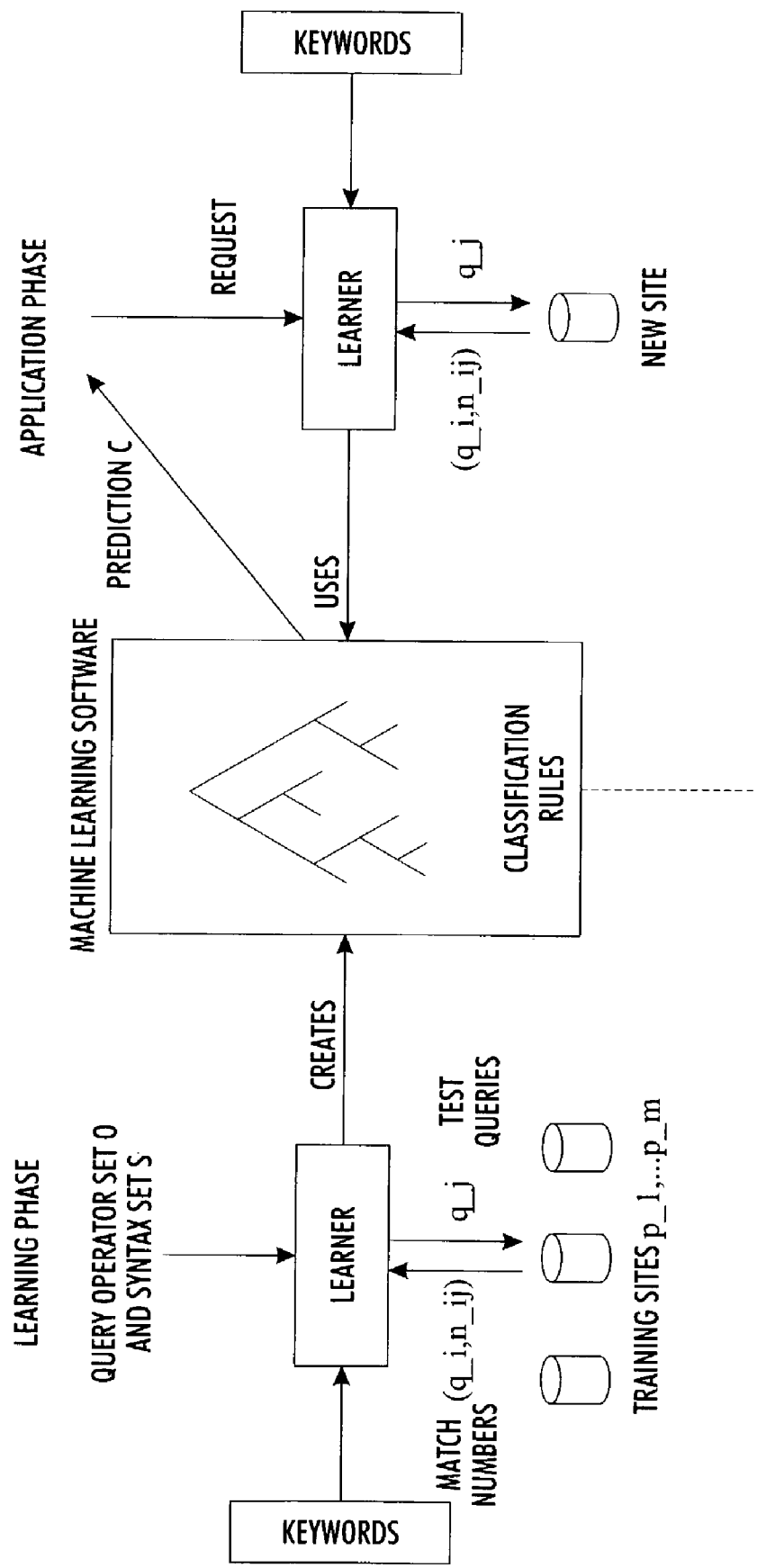
FIG. 1 is a diagram of an architecture of a method for automatic discovery of query language features of a Web information source.

An architecture of a method for automatic discovery of query language features of a Web information source is shown in FIG. 1. In accordance with this embodiment of the method, a determination of supported query operators are provided by the following:

1. A set O of known query operators and a set S of all possible syntaxes for operators from O are defined.

2. A set of search sites (Web information sources) $P=\{p_1, \ldots, p_m\}$ is collected, which are used for training the classifiers. For each of the sites in P and a set of test queries in the set $Q=\{q_1, \ldots, q_l\}$ (including two basic queries $q_1$ and $q_2$ for selected pair of key words), determine the semantics (manually) that the query has on the site.

3. For each query $q_i$ in Q sent to a site $p_j$ in P identify the number $n_{i,j}$ of document matches on the site.

4. For every site in P and every query in Q, transform match numbers $n_{i,j}$ into features according to certain criteria (for example, by normalizing their numeric values by basic queries $q_1$ and $q_2$). These features together with manually obtained classifications of the sites' query features form training data and input for a machine learning software, for example decision tree, k-nearest neighbor algorithm or Support Vector Machine 5. Run the machine learning software on the input created in step 4 and obtain a set of classification rules for all operators in O and syntaxes in S.

6. For any new, previously unclassified Web information source, apply the rule set from 5. Perform steps 3 and 4 on the new site. By applying the rule set, the classification (supported query operators and their syntax) of the new site is determined.

Steps 2 to 5 provide a learning phase of a prototype architecture, an application phase is given by step 6 that, in turn, uses probing and match number detection in steps 3 and 4.

Web resources and query languages vary considerably in the ways they retrieve relevant documents. In the theory of Information Retrieval, there exist at least five basic retrieval models, but only three of these models are generally visible on the Web, namely the Boolean, the extended Boolean and the vector-space model. (Two other models are the probabilistic and the logical one; their Web presence is negligible.) In the Boolean model, a query is a condition that documents either do or do not satisfy, and the query result is a set of documents. In the vector-space model, a query is a list of terms, and documents are assigned a score according to how similar they are to the query. The query result is a ranked list of documents. A document in the query result might not contain all query terms. Finally, the extended Boolean model combines the advantages of both Boolean and vector-space query model. In this model, key words can be led by special characters (like "+" and "−"), requiring an obligatory presence or absence of a given keyword in a document. For example, query "+information +provider" will retrieve all documents containing both keywords and rank them according to some similarity function.

Other complications result from different stemming algorithms or stop-word lists that are often implicit in the providers search interfaces. If a user wants documents about the movie "It" or the rock group "The Who", knowledge about the stop-word behavior of the query interfaces is crucial to deciding whether it is possible to retrieve the relevant information or not.

Analysis of information providers collected by BrightPlanet site (http://www.brightplanet.com) and Xerox AskOnce meta-searcher (http://www.mkms.xerox.com.) suggests that the majority of providers adopt one of three basic models. Moreover, beyond query answers, many resources report the number of documents in their collections matching the query. If a resource deploys the (extended) Boolean model, the match number shows how many documents match the Boolean query. In the case of the vector-space model, the match numbers refer to documents containing at least one query term.

The method for automatic detection of query operators is implemented through the evaluation of match numbers for submitted queries. Though this approach excludes resources that do not report match numbers, other ways of automatic detection of query operators appear even more problematic and difficult to implement. A method based on downloading answer documents and verifying the query against their content often fails, either for access reasons, such as when full content of documents is unavailable or login-protected, or for technical reasons, when a query matches millions of documents and downloading even part of them requires prohibitive time and space resources.

Query Language Model. Expressiveness of any query language is given by the set of basic operators and its ability to build complex queries from the basic operators. A query language of a Web provider includes a set of basic operators and the way of combining the operators to get complex queries. Basic operators have different arities, in particular, the default term processing, unary and binary operators. The default processing refers primarily to the case sensitiveness when parsing query terms. Unary operators include operator Stem which replaces a query term with its lexem; binary operators include the Boolean operators $\wedge$(conjunction), $\vee$(disjunction), and $\neg$(negation, where negation is a binary operator in Web query languages and its interpretation is given by "AND NOT", that is, $A \neg B = A \wedge \neg B$) and operator Phrase, which requires the adjacency of all terms in a document.

Some other operators, like substring and regular expression matching or word proximity operators, have been studied in various research prototypes and commercial products, however the six query operators mentioned above are by far the most frequently supported by Web interfaces. In the following, we develop a method to cope with the operator set O={Case, Stem, $\wedge$, $\vee$, $\neg$, Phrase}.

Query Interpretation.

Web providers are queried by filling their search forms with query strings. CGI or JavaScript code linked to the query form interpret the query strings according to certain rules. These rules permit certain syntactic encodings for supported query operators. If correctly interpreted, the query is executed on the document collection before a (full or partial) answer is reported to the user.

Unfortunately, the same query operator may be encoded differently by different providers. For example, the Boolean conjunction is often encoded as "A AND B", "A B", or "+A +B", where A and B are some query terms. Worse, two providers can interpret the same query string differently. For example, the query string "A B" can be interpreted as Boolean conjunction, Boolean disjunction, or phrase.

EXAMPLE 1

To illustrate the problem, consider the query string q="Casablanca AND Bogart". On Google (www.google.com), "AND" is interpreted as the Boolean conjunction, that is, $i_{Google}$ ("Casablanca AND Bogart")="Casablanca" $\wedge$"Bogart". As result, query q matches 24,500 pages at Google, as opposed to 551,000 for query $q_1$="Casablanca" and 263,000 for query $q_2$="Bogart".

On the Internet Movie Database (IMDB) (www.imdb.com/), "AND" is taken literally and all terms in a query are implicitly OR-connected. Therefore, the IMBD interprets query q as follows: $i_{IMDB}$ ("Casablanca AND Bogart") ="Casablanca" $\vee$"AND" $\vee$"Bogart". The query returns 12,020 matches documents on IMDB, as opposed to only 22 for $q_1$="Casablanca" and 4 for $q_2$="Bogart".

If we investigate an unknown query language, then Example 1 shows that observing match numbers for probe queries can provide a good insight on supported operators. However, no definitive decision appears possible from the three above queries q, $q_1$, $q_2$. An accurate decision on supported operators/syntaxes will require probing the provider with other queries and comparing all match numbers in order to confirm or reject various hypotheses.

EXAMPLE 2

As in Example 1, let us compare match numbers for queries q="Casablanca AND Bogart", $q_1$="Casablanca" and $q_2$="Bogart". For Google, the fact that q matches fewer documents than either $q_1$ or $q_2$, favors the guess of conjunction, but is still insufficient to exclude other hypotheses, like that of phrase processing. Probing Google with query $q_3$="Bogart AND Casablanca" returns the same number of matched documents as q. This discards the phrase hypothesis, but not the hypothesis of "Casablanca" $\wedge$"AND" $\wedge$"Bogart". To discard this one, even more queries be sent to Google, like $q_4$="Casablanca AND", and so on.

The situation is similar with IMDB. The fact that query q matches more documents than $q_1$ and $q_2$ suggests that q is processed as a disjunction, but it cannot tell if "AND" is taken literally or ignored. A deeper analysis requires sending more probe queries to IMDB, for example, queries $q_4$="Casablanca AND" or $q_5$="Casablanca Bogart" to compare their match numbers to the ones of previous queries and decide about the "AND".

The method for automatic acquisition of Web query languages builds a learning system that trains a number of classifiers with data from manually annotated sites in order to automatically determine supported operators and syntaxes at a new site. Training data from annotated sites includes an ensemble of test queries together with the corresponding match numbers.

Problem Definition.

Assume an information provider P supports some or all query operators in O; these operators form a set $O_P$, $O_P \subseteq O$ and allow to compose a set of complex queries $Q(O_P)$. For any operator $o_i \in O_P$, P accepts one or more syntactical encodings, $s_{i1}, s_{i2}, \ldots$ Set $\{s_{ij}\}$ of accepted syntaxes for $o_i \in O_P$ is denoted $S_i$. The interpretation $I_P$ of operator set $O_P$ is defined as $I_P = \{(o_i, s_{ij}) | o_i \in O_P, s_{ij} \in S_i\} = \{(o_i, S_i) | o_i \in O_P\}$. Interpretation $I_P$ is mono-valued if each operator has at most one syntax, i.e., $|S_i|=1$ for all $o_i \in O_P$. $I_P$ is multi-valued, if it allows multiple syntaxes for at least one operator, i.e., there exists $o_i \in O_P$ such that $|S_i|>1$. In Google, the Boolean conjunction can be encoded by both "AND" and whitespace. Therefore, for any query terms A and B, both query strings "A B" and "A AND B" are interpreted as $A \wedge B$. $I_{Google}$ contains ($\wedge$, "AND") and ($\wedge$, whitespace) and is a multi-valued interpretation.

We distinguish between ambiguous and unambiguous interpretations. A pair of distinct operator encodings $(o_i, s_{ij})$ and $(o_k, s_{kl})$ is ambiguous if the two operators have the same syntax: $o_i \neq o_k$ but $s_{ij} = s_{kl}$. An interpretation $I_P$ is ambiguous, if it contains at least one ambiguous pairs of encodings. An interpretation I is unambiguous, if for any pair of encodings $(o_i, s_{ij})$ and $(o_k, s_{kl})$ in I, $o_i \neq o_k \Rightarrow s_{ij} \neq s_{kl}$.

Ambiguous interpretations can be observed with Web providers that interpret query strings dynamically, when the final decision depends on the results of the query execution with different retrieval models. However, the major part of Web providers interpret query strings unambiguously, and our method copes with unambiguous interpretations only.

Like with the query operators, we select the most frequent syntaxes on the Web, S={Default, "*", "whitespace", "AND", "+", "OR", "NOT", "–", "quote marks"}. Note that default refers to the absence of any syntax; it stands for the processing of plain terms. Like set O, these syntaxes have been selected after verification of hundreds of Web providers. Set S is easily extendable with alternative syntaxes, like the ones employed by non-English providers. For example, French providers may use "ET" for the Boolean conjunction and "OU" for the disjunction.

The theoretical framework for the query language acquisition is derived from the learning of an unknown concept by querying. Assume that provider P supports basic operators in O; complex queries composed from the basic operators form a set Q(O). For the document collection at P, query $q \in Q(O)$ constrains a subset P(q) of documents matching q. An abstract query $q \in Q(O)$ is mapped into a textual string with a mapping M: $O \to 2^S$ that defines (possibly multiple) syntaxes for operators in O. The mapping of a complex query q is denoted m(q), the set of mapped queries is denoted Q(S)=Q(M(O)).

The sets O and S are assumed to be known, whereas the mapping M is unknown. We are given an oracle that can be queried with a mapped query $m(q) \in Q(S)$ on the size of subset P(q), oracle(m(q))=|P(q)|. By observing the oracle's responses to queries, the learning system produces a hypothesis for the mapping M, which should be as close as possible to the correct one.

The identification of the mapping M may be simple under certain circumstances. Example 3 shows an example where $O_P$ includes a particular subset of operators and the oracle is noise-less.

EXAMPLE 3

Let O include the three Boolean operators ($\wedge$, $\vee$ and $\neg$) and phrase. Then, for a given syntax set S, any ambiguous mapping M: $O \to 2^S$ can be exactly identified if the oracle is noiseless. (Oracle noise assumes the pure Boolean logic, with no query preprocessing, such as stop word removal.) In such a case, subset sizes returned by the oracle fit the Boolean logic on sets. Indeed, when querying the oracle with terms A and B and syntaxes from S, the disjunction is distinguishable from other operators by the fact that it constrains bigger subsets in a collection that any of terms:

$$|A \vee B| > |A|, |A \vee B| > |B|. \quad (1)$$

Further, among three other operators, the conjunction is recognized by its commutativity:

$$|A \wedge B| = |B \wedge A|. \quad (2)$$

Finally, the difference between negation and phrases is detected by the basic equation linking three Boolean operators, which practically (though not theoretically) distinguishes the phrase operator from the negation $$|A \vee B| = |A \neg B| + |A \wedge B| + |B \neg A|. \quad (3)$$

Sizes of subsets constrained by Boolean operators satisfy the dis-equation (1) and equations (2), (3) for any pair of A and B, so one can easily design a learning system that exactly identifies an unambiguous mapping M after a fair amount of probing queries.

Unfortunately, easy identification of mapping M is rather an exception on the real Web, where few if any of the assumptions made in Example 3 are true. First, any change in the operator set $O_P$ makes the exact reconstruction less obvious. If the conjunction and/or disjunction are not supported, then the sizes of $A \wedge B$ or $A \vee B$ are unavailable and equation (3) can not help to distinguish the negation from phrases. In cases like this, the identification of supported syntaxes requires an analysis of semantic correlation between query terms A and B and guessing on their co-occurrence in (unknown) document collections.

Second, Web query interfaces that play the role of oracles and return sizes of subsets constrained by queries $m(q) \in Q(S)$ are rarely noiseless. When probing interfaces with test queries, the returned match numbers may violate equations (2) and (3). Most violations do happen, because converting query strings into queries on document collections hides the stopword removal and term stemming. This leads to a noise effect, because we don't know for example, whether queries like "A AND B" are interpreted as one (if A is a stopword), two or three terms. Moreover, for the performance reasons, real match numbers are often replaced by their estimations, which are calculated using various collection statistics, without real retrieval of any documents. The approximation of match numbers is typical for search engines indexing millions of documents. As an example, when queried with "knowledge AND discovery" and "discovery AND knowledge", Google reports 1,550,000 and 1,540,000 matches, respectively.

Finally, certain providers behave in a way that cannot explained by any approximation or query preprocessing. An appealing example is Google, which states to support Boolean disjunction with "OR" syntax, which cannot be verified with match numbers. Indeed, querying Google with "cancer OR glaucoma" returns 964,000 matches, while queries "cancer" and "glaucoma" return 12,700,000 and 559,000 matches, respectively. Neither the conjunction nor the disjunction hypothesis can explain these numbers.

Learning System.

We apply the machine learning approach to automatically determine supported query operators. We reduce the overall problem to a set of classification tasks, where each task is associated to the recognition of one specific query operator or syntax, and where some standard learning algorithms, like SVM, k-nearest neighbors, or decision trees can be applied. To build the classifiers, we collect and annotate a set of Web providers. We develop a set of test queries and probe all selected providers with the test queries. Then we train the classifiers with query matches for test queries. For any new provider, we first probe it with the test queries. The match numbers returned by the provider for the test queries are used to automatically classify operators and syntaxes and produce an unambiguous interpretation for P.

To achieve a good classification accuracy, we investigate different aspects of the learning system, including the target function, probe queries, data preparation and feature encoding and selection.

Target function. Due to the multi-valued relationships between query operators and syntaxes, the selection of the target function for our learning system has two alternatives, one for the direct mapping M and one for the inverted mapping $M^{-1}$:

$T_1$: $O \rightarrow 2^S$. $T_1$ targets the unknown mapping M; it assigns zero of more syntaxes to each operator in O. $T_1$ builds a multi-value classifier for every operator $o_i \in O$, or alternatively, a set of binary classifiers for all valid combinations of operators and syntaxes $(o_i, s_j)$, $o_i \in O$, $s_j \in S(o_i)$.

$T_2$: $S \rightarrow O$. $T_2$ targets the inverted mapping $M^{-1}$; it assigns at most one operator to every syntax $s_j \in S$.

Either target function gets implemented as a set of classifiers, operator classifiers for $T_1$ or syntax classifiers for $T_2$. Classifiers are trained with match numbers for probe queries from annotated providers. For a new provider P, either function produces a hypothesis $I^T(P)$ that estimates the real interpretation $I_P$.

The major difference between $T_1$ and $T_2$ is that the former can produce ambiguous interpretations, while the output of $T_2$ is always unambiguous. Indeed, two operator classifiers with $T_1$ can output the same syntax leading to ambiguity, while each classifier in $T_2$ outputs at most one operator for one syntax thus preventing ambiguity. We first summarize the learning system for $T_1$, then we develop in more detail the learning system for $T_1$ which is free of ambiguity.

Operator Classifiers with $T_1$.

In this embodiment, test queries focus on query operators that form the (extended) Boolean and vector space models. For probing a Web information source, a set of eleven queries are selected using the example key words "information" and "retrieval". The set includes two basic queries for the selected key words ("information" and "retrieval") and nine test queries addressing particular query operator/syntax (semantics) pairs.

1) infoRMAtion

This query can have two different syntax (semantics):

LIT—matches the word literally,

CAS—matches the word case-insensitive, 2) informati*

This query can have two different semantics:

LIT matches literally (i.e., 'informati*') or

STM matches the stemming operator (the query matches terms "information", "informatics", etc.)

3) information retrieval

This query can have five different semantics:

ADJ—the two words must appear directly in a row,

AND—both words must appear in the matching document,

OR—at least one of the words must appear in the matching document,

FST—matches only the first word, and

SND—matches only the second word.

Note that the latter two semantics, though rare, are supported by a certain number of Web information sources.

4) "information retrieval"

This query can have the same five different semantics as query 3.

5) +information +retrieval

This query can have the same five different semantics as query 3.

6) information AND retrieval

In addition to the five semantics for the queries 3, 4, and 5 this query can have the following three semantics:

ADJ/3—the three words must appear in a row,

AND/3—the three words must appear in the matching document, and

OR/3—at least one of the three words must appear.

7) information OR retrieval

This query can have the same eight different semantics' as query 6.

8) information −retrieval

In addition to the five semantics for the queries 3, 4, and 5 this query can have the following semantics: NOT (the latter word cannot be matched).

9) information NOT retrieval

This query can have nine different semantics: NOT, ADJ, AND, OR, FST, SND, ADJ/3, AND/3, and OR/3.

To determine which operators are supported by a given Web information source, we probe its search interface with several sets of test queries and collect the match numbers for all queries. Each set of test queries is instantiated by a pair of key words, like "information" and "retrieval" above. In general, selecting key words for the test queries might be challenging, since search resources are usually domain-specific, so randomly selected queries will return no matches. We propose key word pairs from various domains and proceed only with those where both key word queries have matches. Alternatively, it is often possible to guess the resource's domain from the content of search page and/or other pages on the same site.

The key word pairs we select for probing fall into three categories:

1. Words that can form a phrase (such as "information" and "retrieval").

2. Words that do not form a phrase but are likely to occur in the same document (such as "data" and "knowledge").

3. Words that are unrelated (such as "Turing" and "wireless").

Our motivation to use key word pairs from different classes is that the match numbers is two-fold. First, determining the phrase querying features (test query 4 above) is easier with key words that really form phrases (first category). Second, can be very different even for the same type of query. As an example, assuming operator OR is supported in syntax OR, the query "information OR knowledge" is likely to return only slightly more results than queries "information" or "knowledge" alone. On the other hand, "Turing OR wireless" will probably return almost as many results as "Turing" and "wireless" combined.

Building rules for acquiring supported operators is not obvious. A simple look at match numbers of test queries might simply not work. Assume, for example, that two basic queries "information" and "retrieval" match 10 and 20 documents at some Web resource. If the test query "information AND retrieval" matches fewer documents, say 5, does not necessarily mean that Boolean AND is supported. First, the query could be interpreted literally, as a phrase. Second, "AND" could be dropped and two key words left processed as a phrase. Worse, only one of two key words, for example the first one, could be taken into consideration by the search interface. An accurate detection requires a deeper analysis of other test queries. Then, if "information retrieval" has 5 matches too, then it is likely that both queries correspond to the Boolean AND. Otherwise, more cases should be considered. Full-scale classification rules appear to have a complex "if-then-else" structure and machine-learning techniques can be used to automate the process of rules generation.

In this embodiment, Borgelt's decision tree toolkit was used to generate classification rules. An important aspect is the selection of queries and syntax used for the induction. Query matches are raw data and cannot be directly used for building decision trees, as Web resources considerably differ in size; therefore, the query match numbers on different resources are often of different magnitude. A query may match millions of documents on Google, but only a few at a small local resource. To leverage the processing of query matches from resources of different size, we develop two different feature sets for building classifiers. In the first approach, we normalize the query matches by the maximum of matches for the two base queries "A" or "B". Consequently, we obtain features with values mostly between 0 and 1 (except for queries related to the Boolean OR-operator). The second approach to the feature selection uses the "equal-less-more" relationship between any two test queries. This gives us a tree-value feature for each pair of test queries.

We learn a classifier for each of the nine test queries, for each of the two feature selection approaches. When a new resource is probed, each classifier takes as input the features obtained from the raw match numbers and produces a prediction on the semantics of the corresponding test query. To build accurate classifiers we proceeded with training and testing sets of search resources. In our experiments we use k>20 sites with a particular variety of query features. For all sites in the training and testing sets, query features are manually classified to create a features/classification table to train and test the learning algorithm. As experiments show, the presence of noise in raw data and inconsistency in the resources' behavior obtaining highly precise predictors is difficult. However, it allows building accurate predictors that can miss certain features but acquired features are detected correctly.

Although Web providers can differ in interpreting query operators/syntaxes, we argue that the number of possible interpretations for any given operator/syntax remains limited. It means it is sufficient to discover a reasonably set of search resources supporting a given feature/syntax for automatically learning the characteristic behaviors of that feature with respect to some test queries. The method we propose for the automatic acquisition is based on query-based probing of a search interface. In the following, we select a set of query features we want acquire, and prepare for probing a set of test queries with different operators. The assumption is that the number of matches a server returns for a submitted query is available on the first result page (this assumption is verified for the majority of about 100 Web resources we have examined manually). A reasonable set of servers has to be inspected manually to create a training set for the machine learning algorithms. These algorithms then produce a set of declarative rules that indicate whether an operator/syntax is supported or not. The main advantage of using machine learning techniques is to easily modify or extend the feature/syntax set.

Syntax Classifiers for $T_2$.

To build syntax classifiers for target function $T_2$, we should consider, beyond "good" classification cases given by operators in O, some "practical" cases taking place when providers process syntaxes in S literally or simply ignore them. Moreover, for certain providers, we face a difficulty to find any valid interpretation. In the learning system, we extend the set of possible interpretations of syntaxes in S with three more cases, $O'=O \cup \{\text{Ignore, Literal, Unknown}\}$. Syntaxes in S do not have the same alternatives; below we revisit some syntaxes and report possible matches in O', as they are done in the learning system.

Default: case processing for plain query terms, it may be case-insensitive (Case) or case-sensitive (Literal).

"*": this unary operator can be interpreted as Stem, when $i(A^*)=Stem(A)$, Ignored when $i(A^*)=i(A)$, and Literal, when "A*" is accepted as one term.

"whitespace": Whitespace is often a default option for another syntax in S. Three possible interpretations include the Boolean conjunction when $i(\text{``A B''})=A \land B$, the Boolean disjunction when $i(\text{``A B''})=A \lor B$, and Phrase when $i(\text{``A B''})=\text{Phrase}(A,B)$.

"AND": Three alternatives here are the conjunction when $i(\text{``A AND B''})=A \land B$, Ignored, when "AND" is ignored and the query string is interpreted according to the whitespace's meaning, $i(\text{``A AND B''})=i(\text{``A B''})=M^{-1}(\text{whitespace})(A,B)$, and Literal when $i(\text{``A AND B''})=M^{-1}(\text{whitespace})(A,\text{``AND''},B)$.

"OR": Similar to "AND", three possible interpretations include the disjunction with $i(\text{``A OR B''})=A \lor B$, Ignore with $i(\text{``A AND B''})=i(\text{``A B''})=M^{-1}(\text{whitespace})(A, B)$, and Literal with $i(\text{``A OR B''})=M^{-1}(\text{whitespace})(A, \text{``OR''}, B)$.

quote marks: Two possible interpretations are Phrase, when $i(\text{````A B''''})=\text{Phrase}(A,B)$, and Ignore when quote marks are ignored and terms are interpreted with the whitespace, $i(\text{``A B''})=i(\text{``AB''})=M^{-1}(\text{whitespace})(A, B)$.

Similar analysis is done for syntaxes "+". "NOT", and "−". Additionally, all syntaxes for binary operators can be labeled as Unknown.

Probing with test queries. To train syntax classifiers for $T_2$, we collect data from annotated sites by probing their interfaces with test queries and extracting the match numbers. Probing has a fairly low cost but requires a certain policy when selecting terms for test queries, in order to provide meaningful data for the learning. We define a set R of model queries that contain syntaxes in S and parameter terms A and B which are later replaced with real terms.

We form the set R by first selecting well-formed queries that contain all syntaxes we want to classify. Second, we add queries which are term permutations in already selected queries, like permutation "B A" for query "A B". Finally, we add model queries that are not well-formed, but appear helpful for building accurate classification rules. Below, the set R of model queries is illustrated using the pair of terms A and B; model queries are split in three groups containing one, two or three words:

One word queries: "A", "B", UpperCase(A), "A**", Stem(A).

Two word queries: "AB", "BA", ("AB"), ("BA"). "+A, +B", "+B +A", "A−B", "B−A", "A AND", "A OR", "A NOT".

Three word queries: "A AND B", "B AND A", "A OR B", "B OR A", "A NOT B", "B NOT A".

In total, set R is composed of 22 model queries, all in lower case, except UpperCase (A), which is an upper case of term A. Six queries in R are permutations of other queries and three queries are (purposely) not well-formed. These queries "A AND", "A OR", "A NOT" are selected to help determine literal cases for "AND", "OR", "NOT".

Probe queries are obtained from the model queries by replacing parameters A and B with specific query terms, like "knowledge" and "retrieval". These 22 probe queries form a probe package denoted $R_{A,B}$. For a given provider P, probe queries together with corresponding match numbers form the elementary feature set $F^0_{A,B} = \{(m(q_i), \text{oracle}(P(q_i))), w(q_i) \in R_{A,B}\}$.

Query terms are selected from a generic English vocabulary with all standard stopwords excluded. One site can be probed with one or more probe packages, all packages using different term pairs (A,B). In the next section we discuss various approaches to selecting terms for probing.

Term selection. To probe the sites with test queries, we bind model queries in R with query terms. To obtain meaningful training data, query terms should be carefully selected. Overall, terms should not be common stopwords, like "and" or "the". Then, as the term co-occurrence in a provider document collection is unknown, we select pairs with different degree of semantic correlation. The term pairs fall into the three categories described above.

These three categories can be expressed through term co-occurrence in some generic document collection PG. We re-use our query probing component to establish criteria for term selection for the three categories. A pair of terms (A, B) is in category $C_1$ (phrase co-occurrence) if the match number for Phrase (A, B) is comparable with the conjunction $A \wedge B$, that is the ratio of the match numbers is greater than some threshold, $0<\alpha<1$. A term pair (A, B) is in category $C_2$ (high co-occurrence) if the terms are not phrase co-occurred, but their conjunction is comparable with either A or B, that is the ratio of the match number is greater than some threshold $0<\beta<1$. If pair (A, B) does not fit the conditions for categories $C_1$ and $C_2$, then it is in category $C_3$ (low co-occurrence).

For experiments, we have selected Google search engine as generic document collection C and set values of $\alpha$ and $\beta$ both to 0.01. For example, for pair (A="information", B="retrieval") we have for Google, the ratio of |Goo(Phrase (A,B))| to |Goo(A$\wedge$B)| is approximately 0.62>$\alpha$; the pair belongs to category $C_1$. For pair (A="knowledge", B="wireless") we have the ratio of |Goo(Phrase(A,B))| to |GOO(A$\wedge$B)| is approximately 0.0002<$\alpha$, but the ratio of |Goo(A$\wedge$B)| to min(|Goo(A),Goo(B)|) is approximately 0.08>$\beta$; the pair is in category $C_2$. Finally, pair (A="cancer", B="wireless") is in $C_3$, because the ration of |Goo(Phrase (A,B))| to |GOO(A$\wedge$B)|=0.00<$\alpha$ and the ratio of |Goo(A$\wedge$B)| to min(|Goo(A),Goo(B)|) is approximately 0.005<$\beta$.

We manually prepare a list of term pairs and classify them in categories as above. It is important to test all three types of terms pairs, separately or together, since they allow to test different operators in an unknown query language. For each site we probe it either with use one term pairs from one category or from all three categories. We randomly select the pairs from category lists, but we ensure that the two words have more than zero matches.

Elementary features. Match numbers for probe queries in $F^0_{A,B}$ represent elementary features that can be directly used to train classifiers. Unfortunately, this often leads to poor results; the reason is that the Web resources considerably differ in size and, therefore, the query matches from different resources are of different magnitude and thus hardly comparable. A query may match millions of documents on Google, but only a few at a small local resource. To leverage the processing of query matches from resources of different size, we refine raw match numbers and develop two alternative methods of the feature encoding.

Due to the first approach, we normalize the query matches in $F^0$ by the maximum of matches for the two basic queries "A" OR "B". Consequently, we obtain features $F^1$ with values mostly between 0 and 1 (except for queries related to the Boolean disjunction). The second approach $F^2$ to the feature encoding takes the "less-equal-more" relationship between any two probe queries in a probe package. This produces a three-value feature for each pair of test queries.

We train syntax classifiers for each of the two feature refinements. When a new resource is probed, the raw match numbers are refined accordingly to one of two methods and serve as input for classifiers to predict the syntax interpretations. To control the amount of training data and enhance the quality of classification rules, we proceed with two methods of the feature selection. First, we distinguish between relevant and irrelevant features for a given classifier and prune off irrelevant ones. Second, beyond the direct feature filtering, we use a prior knowledge and classify syntaxes using already classified ones.

Experimental Results. To run series of experiments, we collected and annotated 36 Web sites with search interfaces. All sites report the match numbers for user queries and unambiguously interpret their query languages. Selected sites represent a wide spectrum of supported operator sets and no two interfaces have the same interpretation. For each site, we annotated all supported operators and their syntaxes. For the extraction of the match numbers from HTML pages we used the Xerox IWrap wrapper toolkit.

In all experiments we estimate the classification accuracy for individual operators in O (with $T_1$) and syntaxes in S (with $T_2$). We also estimate the mean accuracy for target functions $T_1$ and $T_2$. Experiments are conducted using the cross-validation method. 36 annotated sites are split in N=9 groups, $S_1, S_2, \ldots, S_N$. We run N experiments; in experiment i, classifiers are trained with groups $S_1, \ldots, S_{i-1}, S_{i+1}, \ldots, S_N$ and then tested with sites in group $S_i$. Accuracy values over N experiments are averaged for each operator/syntax classifier and form the individual accuracy. The average of individual accuracy over O/S gives the mean accuracy.

We test the learning system and evaluate the classification accuracy by varying system parameters. We train and test classifiers with three different learning algorithms, decision trees from Borglet's package, k-nearest neighbors (KNN) algorithm and support vector machine (SVM).

Experiments have been run for all parameter combinations; most combinations achieve the mean accuracy superior to 60%. Four system parameters appear uncorrelated in how they influence the classification results. To figure out the most interesting ones, we determine overall "winners" for each parameter, except learning algorithms. The winners are $T_2$ target function, $F_2$ feature encoding and Mixed term selection. RPKfs feature selection behaves best for DT and KNN and PKfs feature selection is the winner for SVM.

Experimental Results. Learning algorithms. Decision trees (DT) are induced by the Borgelt's software; they are then pruned using the confidence level (p=0.5) pruning method. In Support Vector Machines, linear kernel functions have been used. For the KNN method, to determine the optimal value of k we run additional experiments with k=1, 3, 5 and 10. In the experiments, k=3 and k=5 behave closely and yield better results that k=1 and k=10. Hence in all experiments presented below, only KNN results for k=3 are included. As the KNN algorithm can not process too large set of features; this does not permit to test the Ffs and PKfs selection methods.

In total, the three learning algorithms show similar performance. 3NN slightly outperforms DT and SVM for the "winner" combination (86.42% against 84.26% and 79.74%), however it is often less accurate with other parameter combinations. In all remaining tests, we report the accuracy values for all learning algorithms.

Target functions and feature selection. Target functions $T_1$ and $T_2$ implement alternative approaches to the query language acquisition; $T_1$ uses operator classifiers while $T_2$ uses syntax classifiers. $T_2$ has an advantage over $T_1$ because it avoids multi-valued classification and outputs only unambiguous interpretations, while output of $T_1$ should be further tested for ambiguity. Thus we have built the learning system for $T_2$. The learning system for $T_1$ is different in several components, which we do not present here. Series of experiments conducted with $T_1$ and $T_2$ confirm the superiority of $T_2$. As operator classifiers in $T_1$ are trained independently, their combined output does not guarantee the unambiguity. Unlike $T_2$, highly accuracy of individual classifiers may not be translated into global good accuracy, because one misclassification may produce an ambiguous interpretation and undermine good performance of other classifiers.

We have addressed the problem of automatic recognition of operators and syntaxes supported by a Web search query language and have developed a machine learning approach based on reformulation of the entire problem as a set of classification problems. By introducing elaborated solutions for the target function, feature encoding and selection, we have achieved the 86% mean accuracy for the set of most frequent operators and syntaxes.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A computer-implemented method for automatically determining query language operators of a Web information source, comprising:
   providing a search interface for submitting a query, for retrieving documents from a Web information source and for reporting the number of document matches for the query;
   providing a set of known query operators, each known query operator in the set operating according to at least one syntax, wherein for a test query comprising a query operator and a test key word, each syntax of the operator produces a different number of document matches for the test query at a known Web information source;
   performing the test query on the Web information source, wherein the test query produces a number of document matches on the Web information source; wherein the set of known operators comprises the operators of case sensitivity and stemming, Boolean operators, AND, OR, NOT and phrases having more than one key word
   comparing the number of document matches produced by the Web information source with the number of document matches produced by the known operator's different syntaxes; and
   using an established criteria for determining if comparing results indicate the Web information source supports the known query operator according its matching syntax.

2. The method of claim 1, further comprising generating a wrapper for the Web information source, wherein the wrapper supports the set of known query operators according to their corresponding matching syntax.

3. The method of claim 1, wherein the test query comprises one syntax for the query operator and one key word, wherein the query operator comprises a unary operator.

4. The method of claim 3 wherein the unary operator comprises one of case sensitivity and stemming.

5. The method of claim 1, wherein the test query comprises one syntax for the query operator and two key words, wherein the query operator comprises a binary operator.

6. The method of claim 5, wherein the binary operator comprises one of a Boolean operator and a phrase.

7. The method of claim 1, further comprising
   providing a set of known query operators, each known query operator in the set operating according to at least one syntax, wherein for a plurality of test queries, each test query comprising one syntax for a query operator and at least one key word; and
   performing the plurality of test queries on the Web information source, wherein each test query in the plurality of test queries produces a different number of document matches on the Web information source.

8. The method of claim 7, wherein the established criteria comprises a set of classification rules established using the document matches for the plurality of test queries at the known Web information sources and generated using a machine learning technique.

9. The method of claim 8, wherein generating the set of classification rules further includes normalizing document matches by the maximum number of matches for the first and second test queries.

10. The method of claim 1, wherein the established criteria comprises a set of classification rules for the set of known query operators and their syntaxes generated by:
    identifying a set of known Web information sources;
    performing the plurality of test queries on each of the known Web information sources, wherein each test query produces a different number of matches for each of the known Web information sources; and
    transforming the number of matches into features used by a machine learning techniques to generate the classification rules for the known query operators and their syntaxes.

11. The method of claim 10, wherein the key word comprises key word pairs selected from known domains resulting in non-zero matches.

12. The method of claim 10, wherein the key word comprises words that are capable of forming a phrase.

13. The method of claim 10, wherein the key word comprises words likely to occur in the same document.

14. The method of claim 10, wherein the key word comprises words that are unrelated.

15. The method of claim 10, wherein the set of classification rules for determining syntax of a query operator further includes building operator-based classification rules where any classification rule is associated with an operator from the known operator syntax set.

16. The method of claim 10, wherein the set of classification rules for determining syntax of a query operator further includes building syntax-based classification rules where any classification rule is associated with a syntax from the known set.

17. The method of claim 1, where the established criteria comprise a set of classification rules built using a known machine learning technique and wherein the known machine learning technique is one of a decision tree, a k-nearest neighbor algorithm and a Support Vector Machine algorithm.

18. The method of claim 1, wherein the established criteria comprises applying an equal less more relationship between the number of document matches produced by the Web information source with the number of document matches produced by the known operator's different syntaxes.

* * * * *